United States Patent
Taylor et al.

(10) Patent No.: US 7,036,268 B2
(45) Date of Patent: May 2, 2006

(54) FLYING INSECT TRAP

(75) Inventors: Larry R. Taylor, Grand Island, NE (US); C. Ronald Lambert, Columbus, NE (US)

(73) Assignee: Paraclipse, Inc., Columbus, NE (US)

( * ) Notice: Subject to any disclaimer, the term of this patent is extended or adjusted under 35 U.S.C. 154(b) by 0 days.

(21) Appl. No.: 10/831,784

(22) Filed: Apr. 26, 2004

(65) Prior Publication Data

US 2004/0218380 A1 Nov. 4, 2004

Related U.S. Application Data

(60) Provisional application No. 60/467,074, filed on Apr. 30, 2003.

(51) Int. Cl.
*A01M 1/04* (2006.01)
*A01M 1/14* (2006.01)

(52) U.S. Cl. .......................... 43/113; 43/114

(58) Field of Classification Search .................. 43/113, 43/114, 112
See application file for complete search history.

(56) References Cited

U.S. PATENT DOCUMENTS

| 451,215 | A | * | 4/1891 | Wakeman | 43/113 |
|---|---|---|---|---|---|
| 670,996 | A | * | 4/1901 | Morgan | 43/113 |
| 701,362 | A | * | 6/1902 | Kurth | 43/113 |
| 766,700 | A | * | 8/1904 | Kennedy | 43/113 |
| 1,168,798 | A | * | 1/1916 | Glass | 43/113 |
| 1,482,420 | A | * | 2/1924 | Wilson | 43/113 |
| 1,505,651 | A | * | 8/1924 | Loeschen | 43/113 |
| 1,667,876 | A | * | 5/1928 | Steiner | 43/113 |
| 1,723,919 | A | * | 8/1929 | Bykowy | 43/113 |
| 1,946,509 | A | * | 2/1934 | Trammell | 43/113 |
| 1,981,683 | A | * | 11/1934 | Wentzell | 43/113 |
| 2,384,930 | A | * | 9/1945 | Kendrick | 43/113 |
| 3,059,373 | A | * | 10/1962 | Gardner | 43/113 |
| 3,201,893 | A | * | 8/1965 | Gesmar | 43/113 |
| 3,685,198 | A | * | 8/1972 | Smith | 43/112 |
| 4,117,624 | A | * | 10/1978 | Phillips | 43/113 |
| 4,127,961 | A | * | 12/1978 | Phillips | 43/113 |
| 4,282,673 | A | * | 8/1981 | Focks et al. | 43/113 |
| 4,332,100 | A | * | 6/1982 | Schneider | 43/113 |
| 4,356,656 | A | | 11/1982 | Tasma | |
| 4,366,643 | A | * | 1/1983 | Boaz | 43/113 |
| 4,788,789 | A | * | 12/1988 | Boobar et al. | 43/113 |
| 4,876,822 | A | * | 10/1989 | White | 43/113 |
| 4,918,856 | A | * | 4/1990 | Olive et al. | 43/113 |
| 5,111,610 | A | | 5/1992 | Morisset | |
| 5,157,865 | A | * | 10/1992 | Chang | 43/113 |
| 5,274,949 | A | * | 1/1994 | Beaton | 43/113 |

(Continued)

FOREIGN PATENT DOCUMENTS

DE 29716124 U1 * 12/1997

(Continued)

*Primary Examiner*—Darren W. Ark
(74) *Attorney, Agent, or Firm*—Emrich & Dithmar LLC

(57) ABSTRACT

A flying inspect trap has a source of UV light to attract insects and an adhesive sheet to trap them. A concave housing which encloses the light source and the trapping medium has a series of narrow light-transmissive slits in a front wall to permit a direct partial viewing of the source from the front of the unit to enhance insect attraction. A cover mounted above the housing has a reflecting surface in the form of a band shell which reflects light from the source out into the room as well as downwardly in front of the unit, and prevents light from shining directly or indirectly on the wall above the housing.

6 Claims, 6 Drawing Sheets

U.S. PATENT DOCUMENTS

| | | | |
|---|---|---|---|
| 5,365,690 A | 11/1994 | Nelson et al. | |
| 5,505,017 A | 4/1996 | Nelson | |
| 5,634,292 A | 6/1997 | Kitterman | |
| 5,651,211 A * | 7/1997 | Regan et al. | 43/113 |
| 5,722,199 A * | 3/1998 | Demarest et al. | 43/113 |
| 5,813,166 A * | 9/1998 | Wigton et al. | 43/113 |
| 5,950,355 A * | 9/1999 | Gilbert | 43/113 |
| 5,974,727 A * | 11/1999 | Gilbert | 43/113 |
| 6,108,965 A * | 8/2000 | Burrows et al. | 43/113 |
| 6,108,966 A * | 8/2000 | Otomo et al. | 43/113 |
| 6,289,629 B1 | 9/2001 | Greening | |
| 6,393,759 B1 * | 5/2002 | Brown et al. | 43/113 |
| 6,397,515 B1 * | 6/2002 | Brown et al. | 43/113 |
| 6,493,986 B1 * | 12/2002 | Nelson et al. | 43/113 |
| 6,502,347 B1 * | 1/2003 | Carver, Sr. | 43/113 |
| 6,560,919 B1 * | 5/2003 | Burrows et al. | 43/113 |
| 6,817,139 B1 * | 11/2004 | Powell et al. | 43/113 |
| 6,871,443 B1 * | 3/2005 | Lambert et al. | 43/113 |
| 6,886,292 B1 * | 5/2005 | Studer et al. | 43/113 |
| 2001/0042337 A1 * | 11/2001 | Lambert et al. | 43/113 |
| 2002/0073611 A1 * | 6/2002 | Greening | 43/113 |
| 2002/0078620 A1 * | 6/2002 | Nelson et al. | 43/113 |
| 2003/0079398 A1 * | 5/2003 | Holmes | 43/113 |
| 2003/0089024 A1 * | 5/2003 | Nelson et al. | 43/113 |
| 2005/0126069 A1 * | 6/2005 | Taylor et al. | 43/113 |

FOREIGN PATENT DOCUMENTS

| | | | |
|---|---|---|---|
| DE | 19835059 A1 * | 2/2000 | |
| DE | 10236531 A1 * | 2/2004 | |
| GB | 2275409 A | 2/1994 | |
| GB | 2275409 A * | 8/1994 | |
| GB | 2282042 A * | 3/1995 | |
| GB | 2381181 A * | 4/2003 | |
| JP | 8-140549 A * | 6/1996 | |
| JP | 11-46657 A * | 2/1999 | |
| JP | 11-289951 A * | 10/1999 | |
| JP | 2000-69893 A * | 3/2000 | |
| JP | 2001-169709 A * | 6/2001 | |
| JP | 2001-231424 A * | 8/2001 | |
| JP | 2002-306044 A * | 10/2002 | |
| JP | 2003-180221 A * | 7/2003 | |
| JP | 2004-159626 A * | 6/2004 | |
| JP | 2004-275069 A * | 10/2004 | |
| JP | 2004-344070 A * | 12/2004 | |
| JP | 2005-46045 A * | 2/2005 | |
| JP | 2005-58050 A * | 3/2005 | |

* cited by examiner

FLYING INSECT TRAP

RELATED APPLICATIONS

Applicant claims the benefit of provisional application Ser. No. 60/467,074 for "FLYING INSECT TRAP", filed Apr. 30, 2003.

FIELD OF THE INVENTION

The present invention relates to traps for flying insects of the type using an ultraviolet light source to attract insects, and an adhesive sheet or paper to trap them.

BACKGROUND OF THE INVENTION

There have been a number of designs for wall-mounted flying insect traps suitable for use, for example, in the dining area of a restaurant, as distinguished from the food preparation area of the restaurant. Units designed for the dining area are typically wall-mounted, and take the form of a wall sconce so that they appear, in general, to be a decorative wall light to a customer rather than an insect trap.

Since it is known that ultraviolet light attracts flies better than a conventional light source, ultraviolet light sources are typically used in such units, whether they are designed for use in the dining area or in the food preparation area. When such units are used in the dining area, however, if the ultraviolet light is directed onto the wall above the unit, such as in U.S. Pat. No. 5,365,690, it may have a detrimental effect on the wall. Ultraviolet light, over time, deteriorates the color and even the texture in some cases of many wall coatings or coverings. Secondly, fly trap units which rely on a pattern of light generated on the wall near the unit to attract flies may have erratic trapping results because the amount of light "visible" to a fly depends on the color and nature of the wall coating (satin, flat or enamel paint), or wall covering, such as paper, vinyl or Marlite®. Ultraviolet light may also illuminate a painted light surface differently than it would illuminate a dark or textured surface.

Further, in prior designs, the units were mounted at a considerable height above the floor in order to prevent people in the room from looking directly into the unit. It is generally believed that people looking directly at the entirety of an ultraviolet flourescent lamp do not believe that the emanating visible light is attractive, and since the units are intended to be decorative when used in eating areas, they are generally mounted in a manner such as to avoid direct viewing of the entire light source, where possible.

In prior units of this type which are mounted at a considerable height above the floor, and wherein the ultraviolet light is reflected off the wall, obviously the attractant light pattern exists above the unit which is even higher on the wall than the mounting height of the unit. With such an arrangement, at least some of the light pattern, particularly the more intense portion immediately above the unit cannot always be viewed directly by insects located at a level beneath the unit, such as at heights typically associated with tables, serving trays or counters. This is usually where the flies are.

SUMMARY OF THE INVENTION

The present invention includes a housing which is curved into a concave shape, closed on three sides and bottom with an open top and, if desired, an open back. The housing encloses the light source and the trapping medium. This prevents a direct view of the complete lamps at normal mounting heights and lower. The upper front portion of the housing includes a series of groups of narrow slits to permit a direct partial viewing of the light source from a large area of the room in which it is mounted to enhance insect attraction. The inside surface of the housing may be black (i.e. non-reflecting) or a light or white color, or it may be provided with a reflective surface such as metallized Mylar to reflect light upwardly through the top opening of the housing onto a cover mounted above the housing.

The cover is positioned to intercept all light directly from the source as well as all reflected light from within the housing which would otherwise impinge on the wall on which the unit is mounted. To accomplish this, the cover has a shape of a band shell to intercept direct and reflected light and direct all of the incident light from the source, both direct and reflected, out in front of the unit. At least a portion of the light reflected by the cover is directed downwardly in front of the unit. The cover is shaped and positioned relative to the light source so that it prevents light, both direct and reflected, from shining on the wall above the housing. Thus, the attractant light display of the instant unit is located on the cover, and the unit is said to be independent of the wall in this respect.

Light may be observed directly through the slits on the front wall of the housing, although the slits are narrow enough so that the entire image of the source may not be viewed directly. Reflected light emanating from the concave surface of the cover above the light sources may be viewed from almost any location in the room, including locations beneath the horizontal top opening of the housing.

With the present invention, no perceptible amount of light is transmitted directly or indirectly to the wall on which the unit is mounted, thereby preserving any coating or covering on the wall from damage which may otherwise result from the ultraviolet light.

Other features and advantages of the present invention will be apparent to persons skilled in the art from the following description of a preferred embodiment accompanied by the drawings wherein identical reference numerals will be used to identify like parts in the various views.

DETAILED DESCRIPTION OF THE ILLUSTRATED EMBODIMENT

Figure 1:
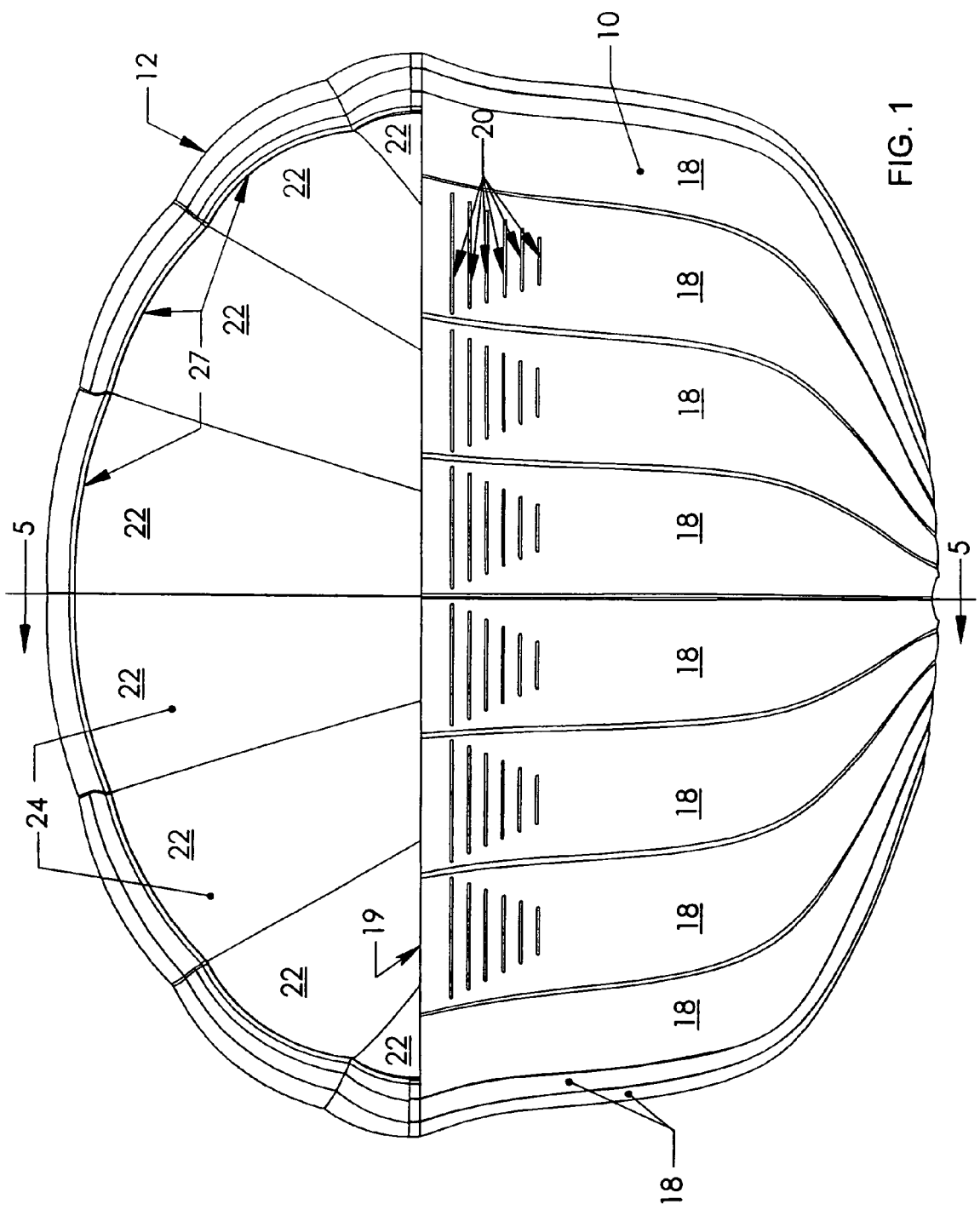
FIG. 1 is a front view of an insect trap constructed according to the present invention.
Figure 2:
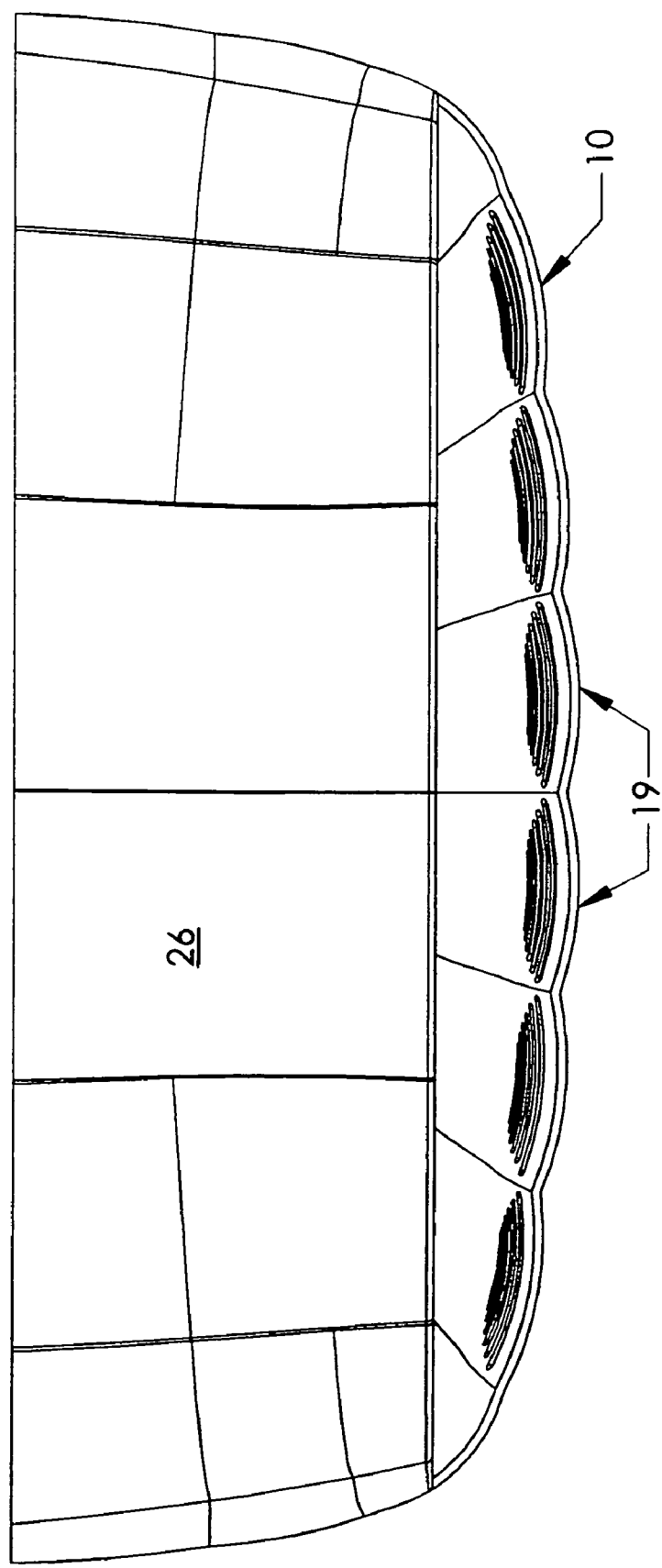
FIG. 2 is a top view of the trap of FIG. 1.
Figure 3:
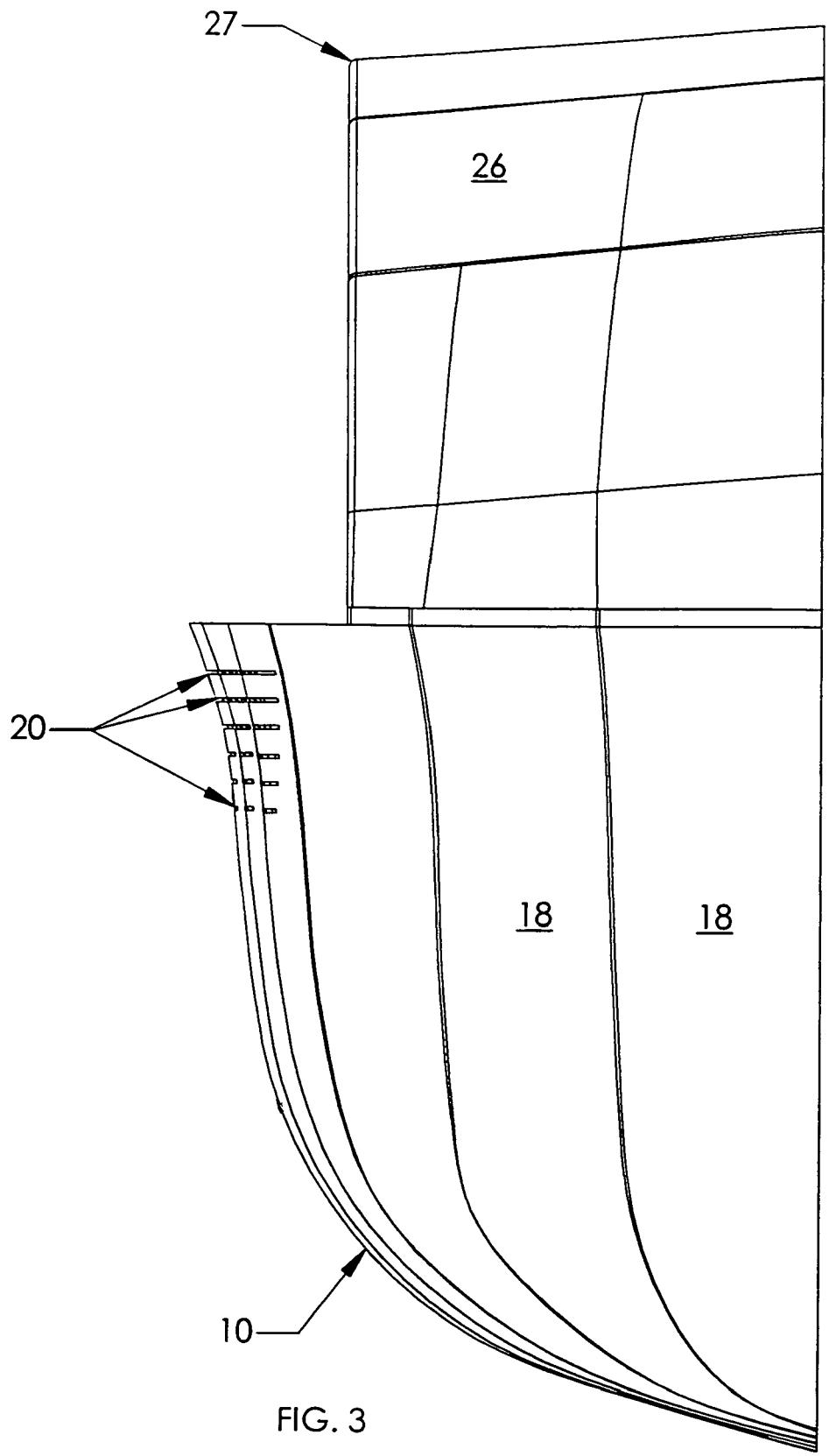
FIG. 3 is a right side view of the trap of FIG. 1.

Referring now to the drawing, it will be helpful in obtaining an overall understanding of the invention to identify the major components. These include a housing generally designated by reference numeral 10. The housing 10, as best seen from FIGS. 1, 2, 3 and 5 has a generally curved, concave shape having closed bottom, sides and front (except for the light slits to be described), and an open top and open back. Mounted above the housing 10 is a cover generally designated 12, and best seen in FIGS. 1–6. The housing 10 and cover 12 may each be integrally molded from a suitable plastic material such as polystyrene (impact) or other suitable plastics; and these two elements may be coupled together and mounted to a mounting plate 32 (FIGS. 5 and 6) which is secured with suitable fasteners to a wall designated W in FIG. 5 to form an integral unit, as will further be described within.

Figure 5:
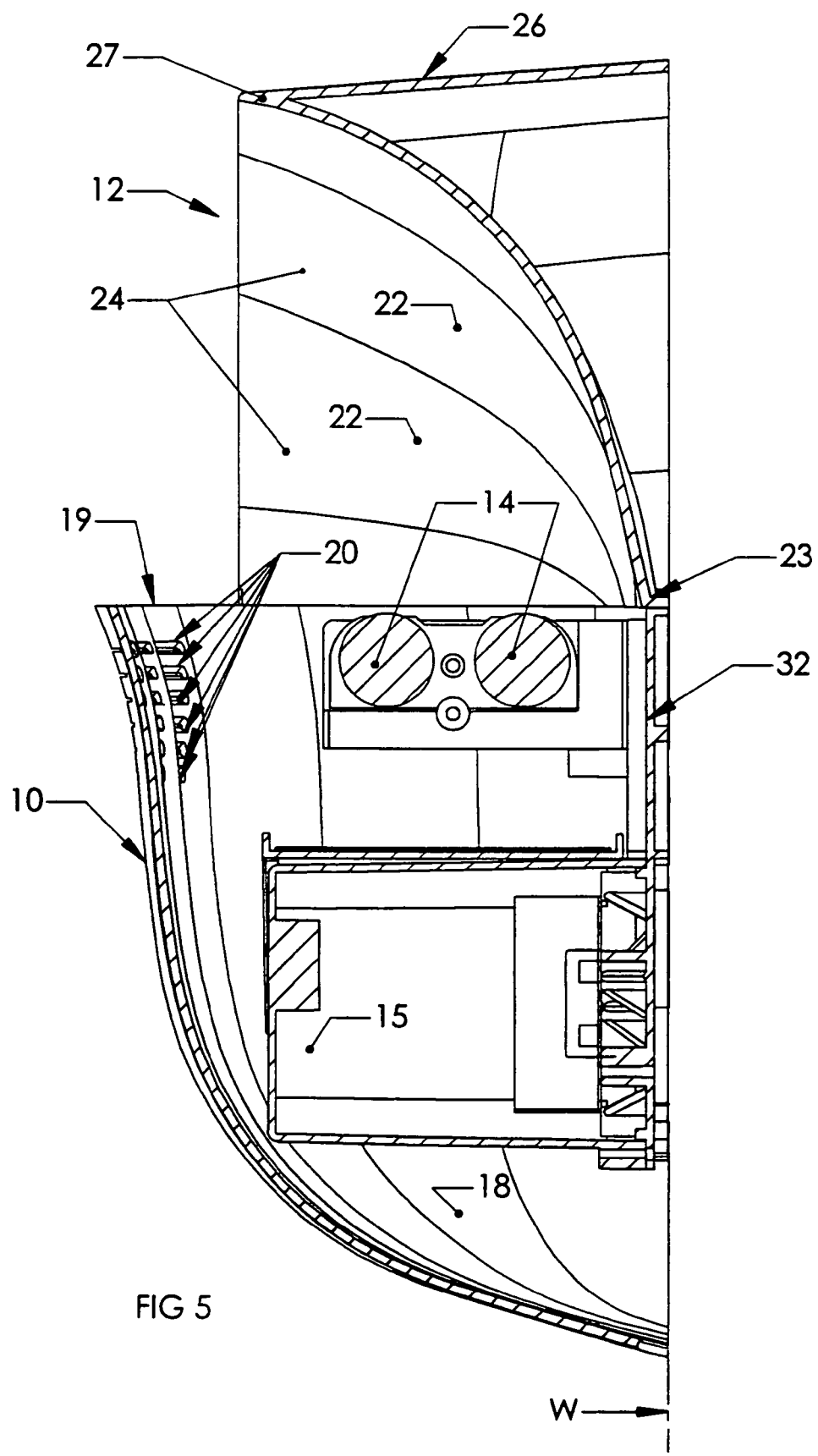
FIG. 5 is a vertical cross-sectional view of the trap of FIG. 1 taken through the sight line 5—5 of FIG. 1, of the cover, housing and mounting plate, but not the cartridge and drive unit.
Figure 6:
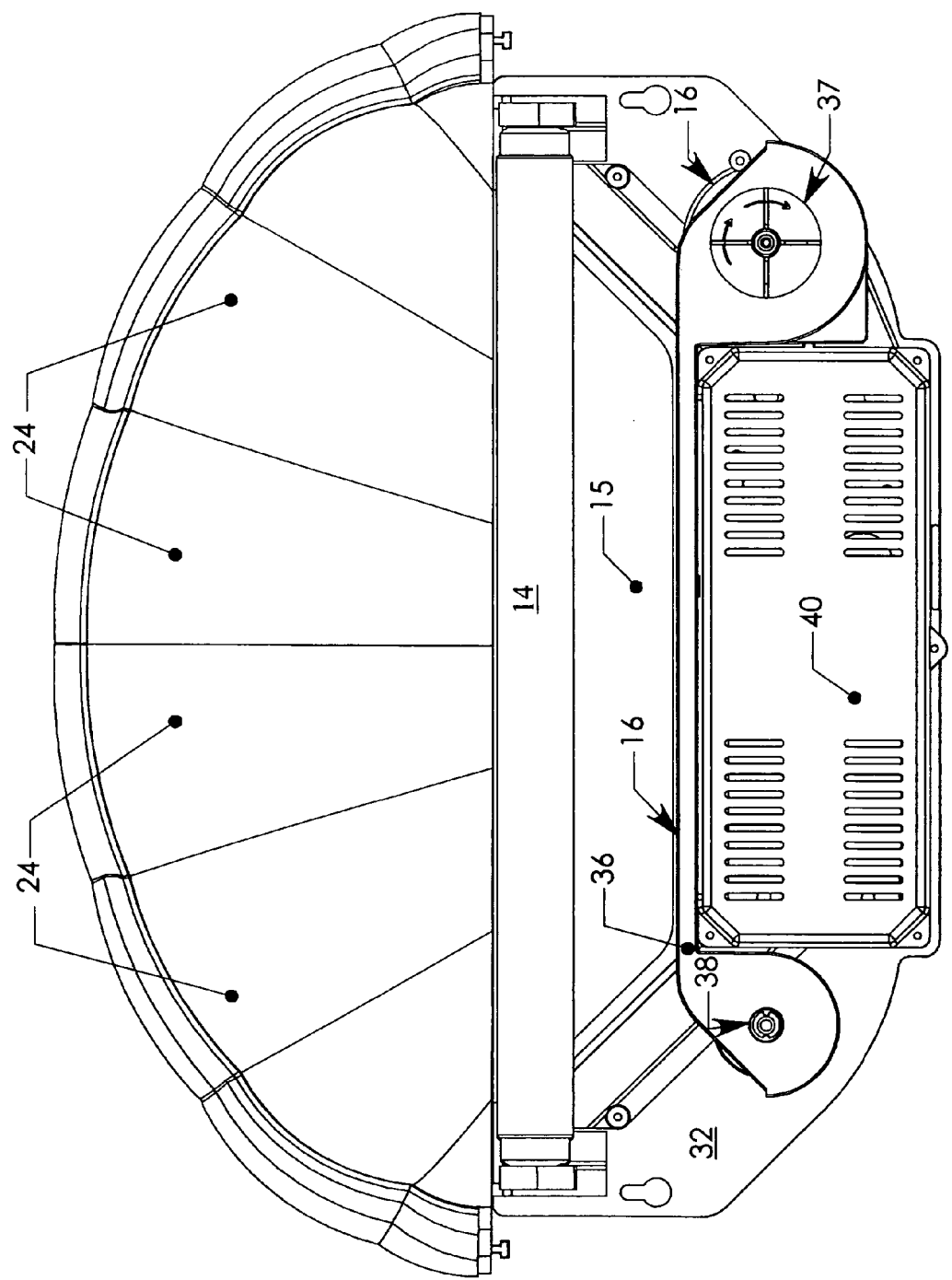
FIG. 6 is a front view similar to FIG. 1 with the housing removed.

Referring for a moment to FIGS. 5 and 6, enclosed by the housing 10 are a pair of flourescent lamps 14 which generate ultraviolet as well as visible light, and a removable cartridge and drive unit generally designated 15 which feeds adhesive-coated sheet or trapping medium designated 16 and in the form of a rolled conveyor medium which is unrolled beneath the lamps 14 to provide a generally flat layer for trapping, and rewound for disposal.

Returning now to the housing 10, it may be shaped in a decorative form of a seashell by means of a plurality of segments designated 18 in FIG. 1. Each of the segments 18 extends from an upper edge 19 which defines a horizontal plane as well as the top opening of the housing 10, downwardly, rearwardly and centrally to the mounting wall W to enclose the lamps 14 and the adhesive cartridge and drive unit 15. The exact shape of the segments 18 is decorative rather than functional, as is the curvature of the housing. The upper portions of the six central segments 18 of the housing 10 each include a series or number of arrays of vertically spaced, horizontally extending light slits (or slots) designated 20 in FIG. 1 for the three segments 18 either side of center, for a total of six arrays in the illustrated embodiment.

The length of the slits 20 may be reduced progressively from top to bottom to provide an overall tapered shape to each array or series of slits. The tapering of the width in each set of slits 20, as well as the shape of the housing 10 and that of the cover 12, as will be described presently, are all for decorative, rather than functional purpose. However, the slits 20 are located and sized in width (that is height in the drawing) so that a person at eye level or below the horizontal plane defined by the upper edge 19 of the housing will perceive directly a series of small segments of the front lamp 14. The same view is obviously also afforded to any flies traveling at such an elevation so that the flies will perceive, not only the reflected light from the cover 12, as will be described below, but also direct light from the forward lamp itself, and as can be appreciated from FIG. 5. This direct viewing angle beneath the upper edge 19 of the housing 10 extends a substantial distance beneath a horizontal plane passing through the axis of the forward lamp 14.

Turning now to the cover 12, it also is comprised of a series of segments 22 each of which extend from a location adjacent the wall W (though spaced therefrom by means of a horizontal flange designated 23 in FIG. 5), upwardly and forwardly, as best seen in FIG. 5, and thence rearwardly and slightly upwardly as indicated at 26 in FIG. 5 back to the wall W. The segments 22 form a generally concave surface 24 which reflects light from the lamps 14 out into the room as well as downwardly in front of the unit.

Still referring to FIG. 5, it can be seen that the segments 22 extend to a transitional portion, designated 27, between the curved, lower segment 22 and the upper return section 26, is located forwardly of the forwardmost portion of both lamps 14. Thus, the reflective surface 24 extends forwardly of the lamps 14. This structure precludes any light from either lamp 14 to be radiated directly onto the wall W on which the unit is mounted. Moreover, the transition section 27 of the cover 12 extends completely, as illustrated in FIG. 1, from one side of the top edge 19 to the housing 10, to the other side; and the front edge of the transition section 27 defines a generally vertical plane which is located relative to the upper portion of the housing 10 (i.e. away from the mounting wall W and extending above and forward of the light sources 14) such that no direct or reflected light from inside the unit impinges on the wall W above the unit. Yet, because of the concave surface defined by the adjacent surfaces of the sections 22 of the cover 12, light is reflected as well as transmitted directly from both lamps 14 outwardly into the room at a level slightly above the upper edge 19 of the housing 10. Reflected light from reflecting surface 24 of the cover is also transmitted downwardly and forwardly in front of the unit, as persons skilled in the art will readily appreciate.

Thus, the viewing angle of flies for sensing both direct and reflected light extends from well below the upper edge 19 of the housing 10 to well above the horizontal plane defined by the edge 19; and this field of view between these two limits is substantially continuous—that is, a fly may perceive both direct and reflected light from the source continuously through a very large vertical angle of displacement of the fly. Obviously, however, as the fly approaches from an upper angle, the amount of direct light is greater.

Figure 4:
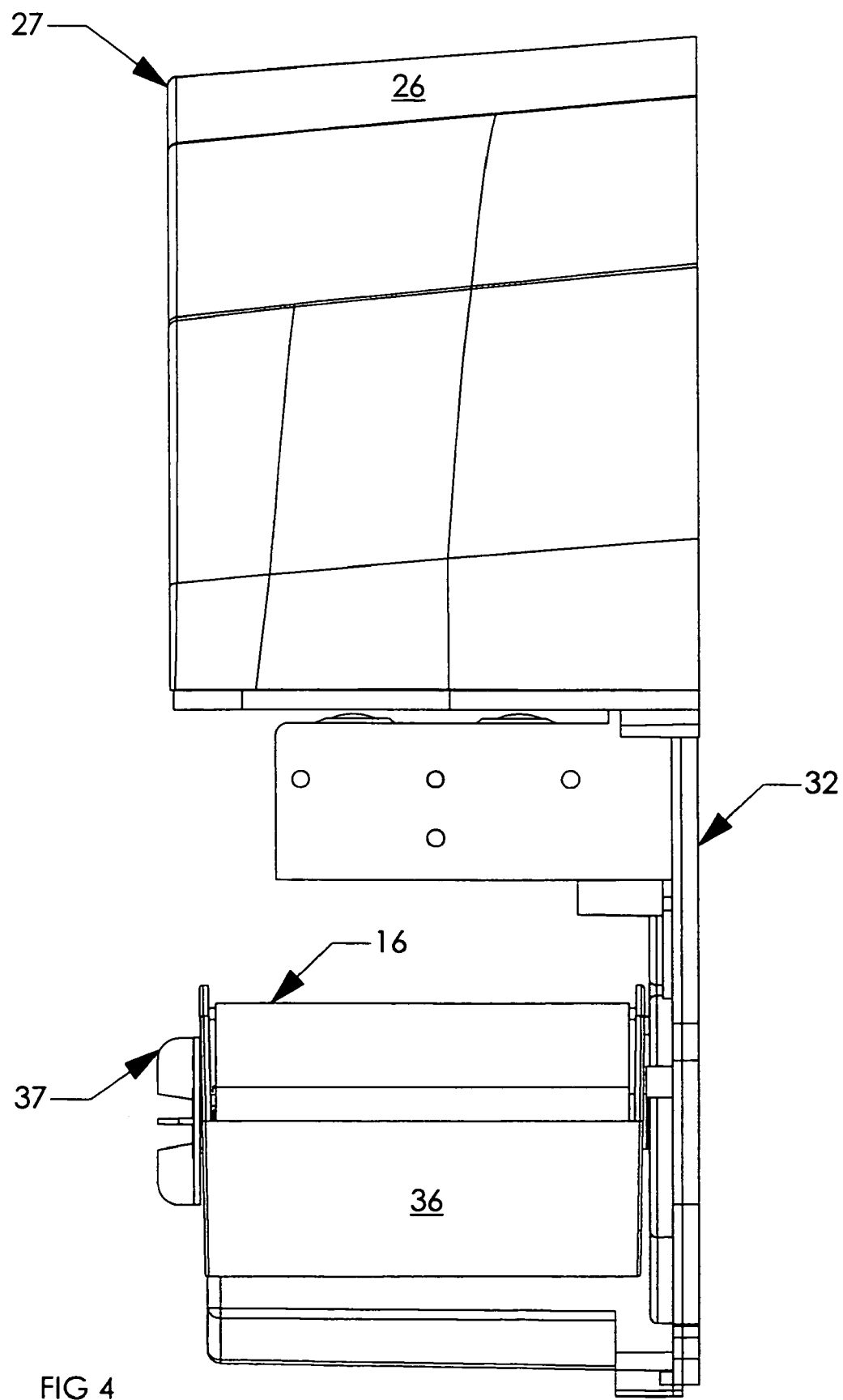
FIG. 4 is a right side view of the trap of FIG. 1 with the housing removed.

Turning now particularly to FIGS. 4 and 5, mounting plate 32 may be mounted to the wall W by any conventional means such as wall fasteners. The lamps 14, as well as the cartridge and drive unit 15, and the housing 10 and cover 12 are all mounted to and/or supported by the mounting plate 32 using suitable means.

The cartridge and drive unit may be the same as that disclosed in the Reagan et al. U.S. Pat. No. 5,651,211 entitled Wall Mounted Trap for Flies and Insects. It includes an elongated roll of adhesive paper which is extended between a source reel 38 (FIG. 6) and a take-up reel 37. The adhesive trapping medium 16 is extended in a plane beneath the lamps 14 to provide an enlarged "catch" surface for the flies. The cartridge 36 is removably mounted to the motor housing 40 and may conveniently be disposed of and replaced as a unit. The take-up reel 37 is driven by a motor mounted within the motor housing generally designated 40 as disclosed in the above-identified Reagan, et al. patent.

Having thus disclosed in detail one embodiment of the invention, persons skilled in the art will be able to modify certain of the structure which has been shown, or substitute equivalent elements for those described; and it is therefore intended that all such modifications and substitutions be covered as they are embraced within the spirit and scope of the appended claims.

We claim:

1. A trap for flying insects for mounting on a wall comprising:

a housing substantially closed on three sides and having an upper edge extending in a generally horizontal plane when said trap is mounted on a wall, said upper edge defining an open top, and a bottom;

a source of insect attractant light in said housing located beneath said upper edge of said housing, said source including an axis extending both generally parallel to and entirely below said generally horizontal plane when said trap is mounted to said wall;

an adhesive trapping medium within said housing below said source of insect attraction light; and a cover mounted to said housing and extending above said housing, said cover being solid and adjacent a wall to which said housing is mounted when said housing is mounted to the wall and having a first portion extending from a rear of said housing upwardly and forwardly of said sides of said housing and defining a forward edge extending in an upright direction and located in front of said light source when said trap is mounted on a wall, said cover having a reflective surface shaped and positioned to prevent light emanating from said source to be transmitted to said wall while reflecting light from said source outwardly and downwardly in front of said housing for viewing at a location in front of said housing both above and below said upper edge of said housing wherein said cover first portion is curved upwardly and forwardly proceeding from an upper rear central portion of said housing, said cover first portion also being curved proceeding from rear side portions of said housing forwardly and above said sides of said housing to define said forward edge, said cover having a second portion extending above said first portion and rearwardly from said forward edge toward said wall when the housing is mounted to said wall, such that said cover intercepts substantially all direct light from said source and substantially all internally reflected light from said source which is transmitted toward said wall such that no light is transmitted from said trap to said wall.

2. The trap of claim 1 wherein said housing includes an interior reflective surface for reflecting light from said source onto said reflective surface of said cover for further reflection in front of said housing above and below said upper edge thereof.

3. The trap of claim 1 wherein said housing includes at least one horizontally elongated slit permitting only a portion of said source to be viewed directly from a location in front of said trap when mounted on a wall at an eye level below said upper edge of said housing.

4. The trap of claim 3 wherein said at least one horizontally elonaated slit of said housing includes a plurality of horizontally elongated slits spaced from one another in a vertical direction when said trap is mounted on a wall.

5. The trap of claim 4 wherein said housing includes a plurality of arrays of said slits, each array comprising a plurality of vertically spaced, generally horizontally elongated slits.

6. The trap of claim 5 wherein each array of said slits comprises a plurality of horizontally elongated slits and characterized in that said slits have a progressively reduced horizontal length when proceeding from a top to a bottom of an array, and all of said arrays of said slits are laterally aligned and equally spaced beneath said upper edge.

* * * * *